United States Patent [19]
Kesselring

[11] Patent Number: 5,299,903
[45] Date of Patent: Apr. 5, 1994

[54] RETRIEVAL GUIDE FOR BOAT TRAILERS

[76] Inventor: Harry N. Kesselring, W. Hill Rd., R.D. 3, Box 61, Elmira, N.Y. 14903

[21] Appl. No.: 115,911

[22] Filed: Sep. 1, 1993

[51] Int. Cl.$^5$ .............................................. B60P 1/52
[52] U.S. Cl. ................................ 414/534; 280/414.1; 414/529
[58] Field of Search ............... 414/507, 529, 530, 531, 414/532, 533, 534, 535, 536, 462; 280/414.1, 414.2, 414.3

[56] References Cited

U.S. PATENT DOCUMENTS

| | | |
|---|---|---|
| 2,586,485 | 2/1952 | Schroeder . |
| 2,827,304 | 3/1958 | Backus . |
| 3,057,493 | 10/1962 | Cameron ..................... 280/414.1 X |
| 3,896,948 | 7/1975 | Finney ................................ 414/536 |
| 3,974,924 | 8/1976 | Ullman, Jr. . |
| 4,094,527 | 6/1978 | Miller ........................... 280/414.1 X |
| 4,209,279 | 6/1980 | Aasen . |
| 4,620,716 | 11/1986 | Carbone . |
| 4,684,145 | 8/1987 | Tingley . |
| 5,013,206 | 5/1991 | Ernst et al. . |
| 5,152,657 | 10/1992 | Kehne . |
| 5,165,706 | 11/1992 | Fond . |

FOREIGN PATENT DOCUMENTS 370703  3/1923  Fed. Rep. of Germany ... 280/414.1

Primary Examiner—Frank E. Werner
Attorney, Agent, or Firm—Michael F. Brown; Christopher A. Michaels

[57] ABSTRACT

A pivoting keel guide for boat trailers which can be used with most boats, can be easily field added to existing trailers, and which will provide excellent centering action for crosswinds when the trailer is submerged. A base plate attaches to a cross-member of the trailer. Pivotally attached to the base plate is a U-channel guide arm, with a pair of guide rollers supported on roller arms mounted on the end of the guide arm opposite the pivot. The guide arm is biased into a raised position using resilient elements such as springs, so that the guide rollers can contact the bottom of the boat while the trailer is submerged. The guide arm pivots along the length of the trailer as the boat settles onto the trailer, exerting a constant centering force.

13 Claims, 2 Drawing Sheets

RETRIEVAL GUIDE FOR BOAT TRAILERS

FIELD OF THE INVENTION

The invention pertains to the field of attachments for boat trailers. More particularly, the invention pertains to devices for aiding the retrieval of boats onto mobile trailers.

BACKGROUND OF THE INVENTION

Trailers have long been used to transport boats over the road. In most cases, for most boats which are small enough to be moved and launched by the user, the trailer consists of a frame with a cradle to hold the boat, with a raised portion in front to attach to a ring in the bow of the boat. The cradle may be formed of rollers or of padding-covered flat props.

When the boat has been driven to the body of water in which it is to be used, the trailer is backed down a ramp, and the boat is released into the water. For retrieval, the process is reversed.

In most cases, the retrieval process involves submerging the trailer to a greater or lesser degree. The boat is then floated up over the trailer, the bow fastened to the front of the trailer, and the trailer is pulled out of the water. As the trailer is pulled up the ramp, the boat settles onto the trailer, ready for transportation over the road.

If the cradle on the trailer is of the kind provided with rollers, the trailer need not be fully submerged, as the boat can be pulled up the rollers by means of a winch or the like. Schroeder, U.S. Pat. No. 2,586,485, Carbone, U.S. Pat. No. 4,620,716, and Ullman, U.S. Pat. No. 3,974,924, show three of the many patents on roller-keel trailers in which the varying number and arrangement of rollers on the keel are expected to exert a centering action, once the boat has settled onto them. These rollers can do little or nothing when the boat is floating in the water above them, as is the case when the trailer has been backed into the water. If the trailer is not submerged, then the rollers can act to a greater or lesser degree to center the boat, but at the cost of having to actually winch the boat out of the water with the guide rope, which takes far more effort than merely centering the boat and driving the trailer up the ramp.

Trailers without rollers must be submerged entirely, and then driven out of the water with the boat on them, as the boat will not easily shift once it is resting on the padded props.

While this process sounds simple in theory, in practice the actions of wind, waves and water currents make retrieving a boat much more complicated. The boat can be easily attached to the winch at the bow, but if it is not accurately aligned on the trailer it will not settle properly into its cradle as it is pulled out of the water.

The wind can exert a major force on a small boat—in fact, it is more of a factor in small, light boats which are easily blown about than in larger, heavier boats. The boat will tend to weathercock in the wind, pivoting around the bow attachment. It does not take much wind to blow the boat fully sideways, right off the trailer, before the owner can get into the car and pull it out of the water.

In rollerless trailers, there is no centering tendency at all—however the boat settles, there it will ride. In a worst case, the boat could be damaged as it lands incorrectly and bounces on the props under wave action.

Tilting trailers, where the tongue breaks and allows the trailer to articulate, can alleviate the problem to a minor degree. However, this requires extensive modification to the design of the trailer, can weaken the structure, and cannot easily be added to existing trailers in the field.

There have been a number of attempts in the past to devise trailers which will center the boat, but they have not met with commercial or practical success. The following patents are offered as examples of the different types of boat-guiding trailers, and are not intended to be an exhaustive list of all such trailer patents.

Tingley, U.S. Pat. No. 4,684,145, shows a pivoting bow guide which is mounted in the rear third of the trailer and pivots forward, sliding down the bow and under the keel, as the boat is pulled onto the trailer. Like all bow guides, Tingley's device is of little use in crosswinds, as the rear of the boat is free to weathercock as the bow is pulled forward. Further, his guide will work properly only with boats having smoothly tapered keels as shown in the patent—a flat-bowed boat, or one without a sharp keel (most fiberglass boats) will not center properly with this guide.

Kehne, U.S. Pat. No. 5,152,657, shows another pivoting bow lever. Kehne has the opposite intention of the present invention and Tingley, in that the lever is pulled upward with a cable to lift the bow and force the boat off the trailer.

Backus, U.S. Pat. No. 2,827,304, is an example of another class of boat-centering devices using upright posts at the rear of the trailer to guide the boat as it is pulled up onto the trailer. This kind of guide looks good in theory, but in practice in a crosswind the boat tends to push against the downwind post, which retracts against its spring, and the boat does not then center properly. Such a guide will prevent the boat from weathercocking completely perpendicular to the trailer, but it will not center accurately enough for the boat to ride correctly, especially on rollerless trailers. Backus' modification of the general design, using intermeshing gears to move both guides in tandem, would exaggerate the problem, as pressure against the downwind guide would open the pair excessively and the boat would be even less likely to center properly.

Another drawback of all boat guides which mount at the rear of the trailer, of whatever kind, is that it becomes necessary to enter the guides from the rear. In practice, this means that the boat usually has to be pushed backwards into the water and then guided back through the guides. This can be very difficult with larger boats or windy conditions.

A number of patents have been granted on trailers which include floating or levered boat cradles which completely surround the boat, parallel to the water surface. Fond, U.S. Pat. No. 5,165,706, and Ernst, U.S. Pat. No. 5,013,206, are examples of this kind of trailer. While this type of trailer does eliminate the weathercocking problem completely once the boat is in the cradle, it adds significantly to the weight, cost and complexity of the trailer, and cannot easily be added to an existing trailer.

Aasen, U.S. Pat. No. 4,209,279, shows a loading guide which, like the present invention, can be added to existing trailers, and which acts to guide the bottom of the boat as it settles onto the trailer. However, it has a number of drawbacks. Like the rear post guides, especially Backus, the boat would tend to push against the downwind guide and resist centering, and the linked guides would tend to exacerbate this effect. Also, like Tingley, the design is limited to boats with sharp, evenly tapering keels, on which the guides can evenly ride sideways as the boat settles. This design would be useless in a semi-catamaran design, where there are multiple parallel keels, as the guides would tend to hang up between the keels. On a flat bottomed boat with a thin keel, such as is commonly found in aluminum boats, Aasen would have no centering effect at all.

SUMMARY OF THE INVENTION

The invention provides a keel guide for boat trailers which can be used with most boats, can be easily field added to existing trailers, and which will provide excellent centering action for crosswinds when the trailer is submerged.

A base plate attaches to a cross-member of the trailer. Pivotally attached to the base plate is a U-channel guide arm, with a pair of guide rollers supported on roller arms mounted on the end of the guide arm opposite the pivot. The guide arm is biased into a raised position using resilient elements such as springs, so that the guide rollers can contact the bottom of the boat while the trailer is submerged. The guide arm pivots along the length of the trailer as the boat settles onto the trailer, exerting a constant centering force.

DESCRIPTION OF THE PREFERRED EMBODIMENT

Figure 1:
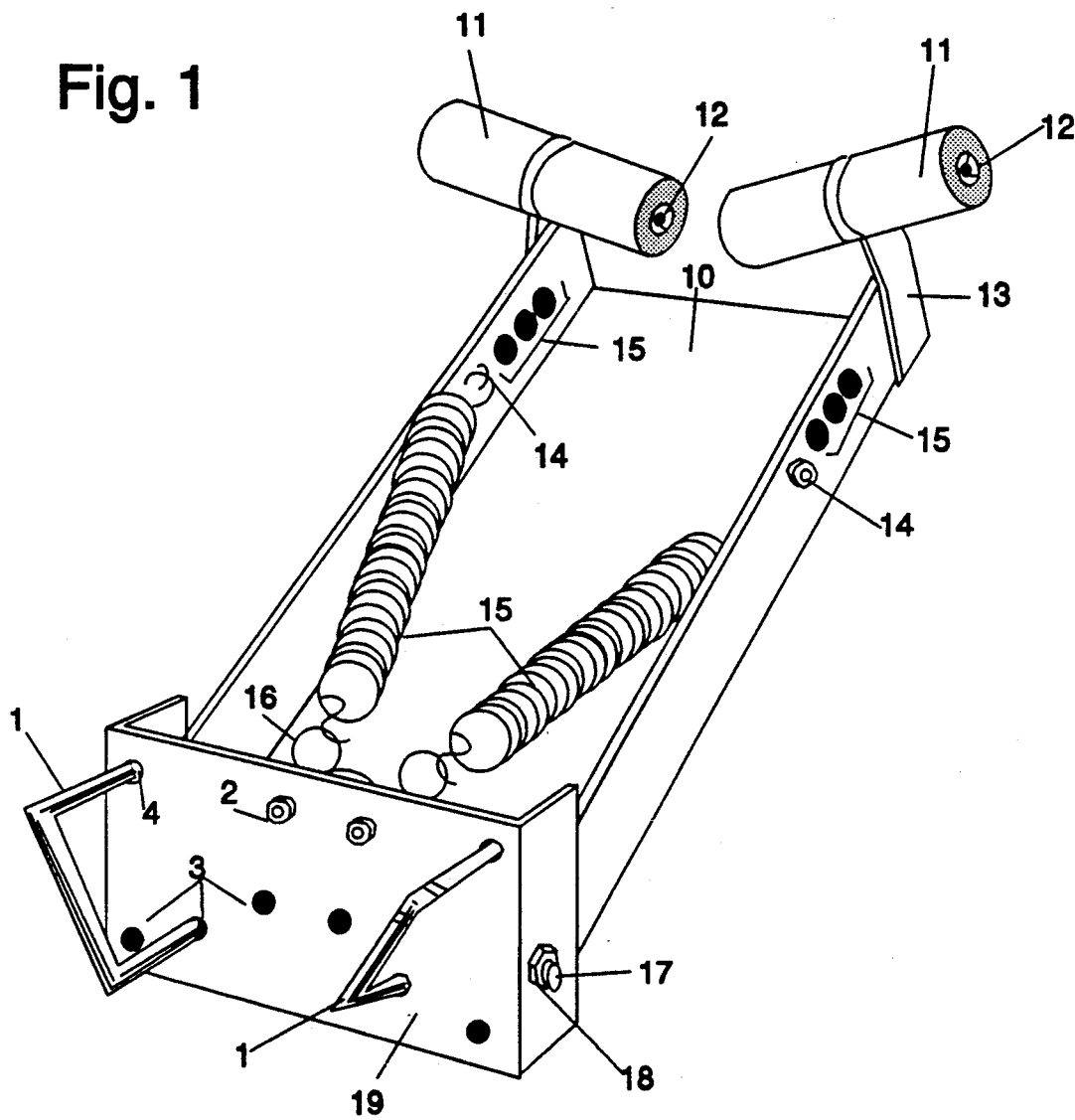
FIG. 1 shows a perspective view of the preferred embodiment of the invention.

FIG. 1 shows a drawing of the preferred embodiment of a keel guide for boat trailers built according to the teachings of the invention.

The guide has a base plate (19) for mounting to a cross member of the boat trailer. Preferably, this base plate (19) is made of "U" channel metal, with a flat base plate and sides, although an embodiment using just the flat plate with brackets for the guide arm assembly would be possible. The base plate could be manufactured of any appropriate metal within the teachings of the invention, although aluminum is preferred because of the environmental effects of being periodically submerged.

The base plate (19) is attached to the trailer cross member by any convenient means. For a guide suitable for retrofit to various existing trailers, it is preferred to mount the base plate using a clamp comprised of flat-ended "U" bolts (1) passing through the base plate (19) and clamping around the trailer cross member (not shown). If the size of the cross member is fixed, then the "U" bolt can be chosen to be of a specific size (leg spacing) and appropriate holes drilled in the base plate to allow the "U" bolt to be mounted with the crosspiece of the "U" vertical. However, in a universal guide, the cross-member could be 3, 3½, or 4" across in the most common sizes, and the base plate will need to be adaptable to this range of sizes. In the preferred embodiment, therefore, the upper leg of the "U" bolt (1) passes through a primary hole (4), and the lower leg may be inserted in one of a plurality of secondary holes (3), arranged in an arc whose radius is the spacing between the legs of the "U" bolt. The vertical measure between the center of the various lower holes (3) and the center of the upper hole (4) is slightly greater than the width of the various trailer cross-members to be accommodated.

The guide has a guide arm (10), which is in the shape of a "U" channel, with open ends, a flat bottom and sides. This guide arm is also made of metal, with aluminum the preferred material. The guide arm is mounted to the base plate by a pivot, which allows the guide arm to move freely from a lower position parallel to the trailer and an upper position which is preferably at an angle of 45° or less from the vertical. The length of the guide arm and the angle will determine how far above the trailer the guide will extend when in the upper position. In the preferred embodiment, the raised angle is 45°, and the guide extends some 14" above the trailer.

In the preferred embodiment, the pivot shaft comprises a bolt (17) which passes through holes drilled in the sides of the "U" shaped channels comprising the base plate (19) and guide arm (10). The pivot shaft (bolt) (17) is held in place with a nut and washer (18) threaded onto the end of the bolt, although other arrangements are possible, such as a shaft held in place with "C" clips in slots machined into the ends.

The end of the guide arm (10) opposite the base plate (19) supports two cylindrical rollers (11) for contacting the bottom of the boat. The rollers (11) are mounted on roller arms (13) which are attached to the guide arm (10) by bolts or any other convenient means. The roller arms (13) support the rollers (11) sufficiently high above the guide arm (10) so that the rollers do not contact the arm and are free to rotate.

The roller arms (13) are bent slightly so that the axes of the roller cylinders meet at a slight "V" angle, so that the rollers can exert their centering action on the boat bottom. This angle need not be too acute (the preferred embodiment uses an angle of approximately 15°), so as to fit on boats with or without sharp keels.

In the preferred embodiment, the rollers (11) are made of polyurethane material, with a diameter of approximately 2½". A single 12" piece of 2½" diameter polyurethane rod can be drilled lengthwise and cut into four 3" pieces to form the rollers in the preferred embodiment. As shown in the drawings, the preferred embodiment of the invention splits the rollers in two, with the roller arm (13) passing through the middle of the length of the roller (11). The roller (11) rotates on a shaft (12) passing through the drilled center of the roller (11) and through a hole on the end of the roller arm (13). The shaft may be kept in place with cotter pins fitting into holes in the end of the shaft, with washers underneath as needed, and the cotter pins and washers are preferably recessed into the ends of the rollers to keep them damaging the boat or being knocked off accidentally. This arrangement allows the rollers to be easily installed and replaced by pulling the shaft from the center of the roller. Other designs, using split or unsplit rollers, are also possible within the teachings of the invention.

The guide arm (10) is biased into the upper position by a resilient element, preferably springs (15) as shown.

The springs are attached to eye-bolts or hook-bolts (16) which mount to the base plate through nuts or other fasteners (22). The other end of the springs (15) mount to eye-bolts or hook-bolts (14) attached near the upper end of the guide arm (10). The tension on the springs (15) is preferably made adjustable by providing a plurality of holes (15) into which the upper end of the spring may be attached. Other resilient elements may be used within the teachings of the invention, such as resilient rubber "bungee cords", heavy rubber bands, or springs in torsion centered on the pivot shaft.

Figure 2:
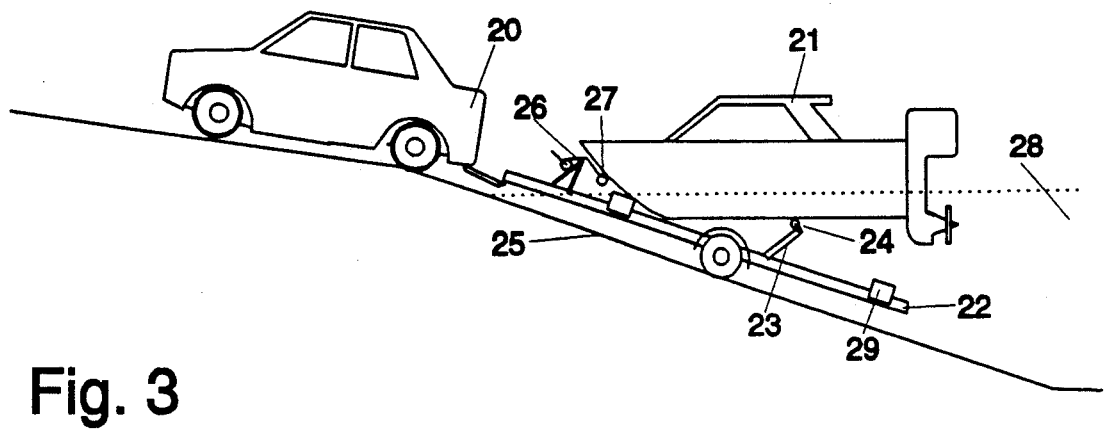
FIG. 2 shows a side view of the invention as mounted in a trailer, with the trailer on a launching ramp, submerged under a boat.
Figure 3:
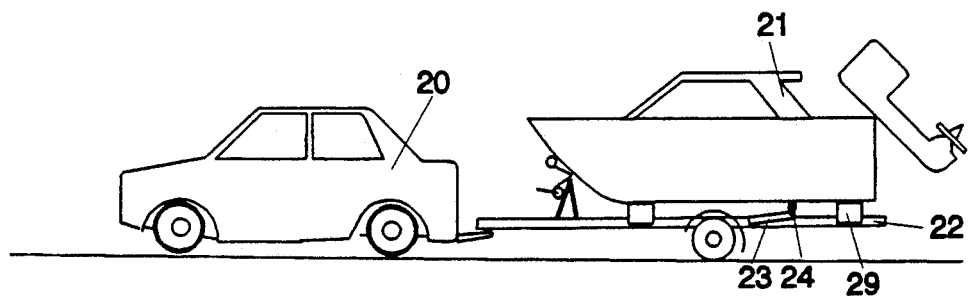
FIG. 3 shows a side view of the invention as mounted in a trailer, with the trailer pulled up the ramp and the boat resting on the trailer.

FIGS. 2 and 3 show the invention in use on a trailer. In FIG. 2, a boat (21) is shown floating on the water (28) above launching ramp (25). A boat trailer (22), attached to a car (20) has been backed down ramp (25) until the trailer (22) is largely submerged, preparatory to retrieving the boat (21). The trailer has a number of boat supports (29) for the stern and sides of the boat, which are shown as the flat carpet-covered supports used in many trailers. The trailer has a bow-attachment point (26) in the form of a tripod with a hand-winch, with a cable or rope which ties to a ring (27) in the bow of the boat (21).

The guide of the invention (23) is shown in its raised position, with the rollers (24) contacting the bottom of the boat (21). In using the device to retrieve a boat, the trailer would be submerged until the rollers (24) were just under the surface, but not so far that they would miss the bottom of the boat. The boat can then be guided by hand onto the rollers, which are pressed into the boat bottom by the springs (15), and is then winched using the bow rope in ring (27) until it is in position over the trailer (22). In this position, the bow is held in place by the bow guide (26) and rope in the bow ring (27), as in the prior art. The boat (21) is constrained against weathercocking by the rollers (24) on the guide of the invention (23), contacting the centerline of the bottom of the boat under the urging of springs (15).

Once the bow of the boat is firmly in place, then the car (20) and trailer (22) can be driven up the ramp (25). The guide holds the boat centered on the trailer, so this can be done without the need for additional people to guide the boat as the trailer is pulled up onto dry land. As the trailer is pulled up the ramp, the boat settles onto it, and the guide is pushed down against the springs until it is in its lowered position as the boat is fully on its supports (29) on the trailer, as shown in FIG. 3.

Figure 4:
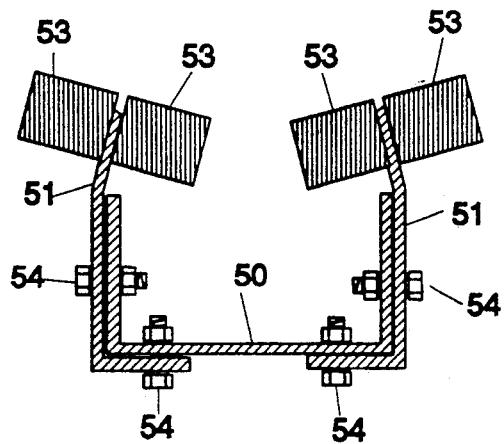
FIG. 4 shows an end detail view of the guide arm, before the boat settles onto the guide.
Figure 5:
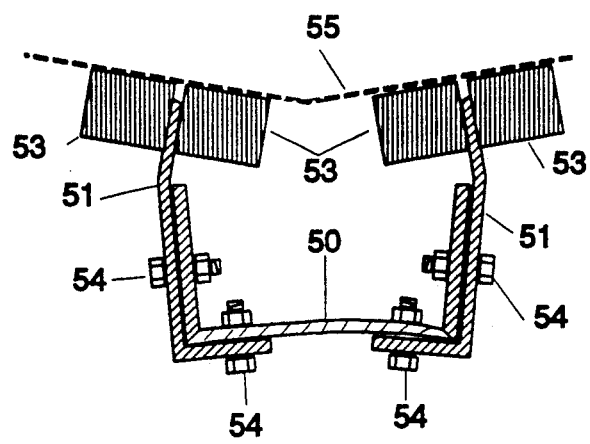
FIG. 5 shows the same view as FIG. 4, after the guide arm is in contact with the bottom of the boat.

FIGS. 4 and 5 show details of the arm and rollers as they would appear in use with a boat. In FIG. 4 the guide arm (50) is shown to be a flat-bottomed U-channel, with a bottom and flat sides. The roller arms (51) can be seen attached to the guide arm (50) with bolts (54) on the bottom and sides. It is important in the preferred embodiment of the invention that the roller arms are firmly attached to the guide arm (50), as will be seen in the discussion of FIG. 5, below. The roller arms (51) are seen to be slightly bent where they extend above the sides of the guide arm (50), setting the angle at which the axes of the rollers (53) meet.

Obviously, few boat bottoms will have exactly the "V" angle of the rollers, and a keel guide intended for universal retrofit to existing trailers cannot, by definition, be custom-made to fit specific boats. In the preferred embodiment of the invention, this is easily addressed. The metal of which the guide arm is made should preferably be capable of flexing resiliently as the rollers are forced into contact with the hull by the springs pressing the arm up and the weight of the boat pressing downward against the springs. This deformation of the guide arm allows the rollers to align themselves with the shape of the hull bottom.

This can be seen in FIG. 5, in which a boat hull (55) with a slightly shallower "V" than that pre-set into the rollers is shown in contact with the rollers (53). The roller arms (51) cannot deform easily, as they are bolted firmly to the sides and bottom of the guide arm (50) with bolts (54). However, the flat bottom of the guide arm (50) is free to deform in the manner of a spring, curving upwards as shown, which allows the angle of the rollers (53) to flatten slightly to conform to the hull (55). Similarly, the guide arm (50) can deform the other way to fit hulls with steeper "V" angles. It has been found that 1/8" aluminum is preferable for this application. It will deform sufficiently to fit most boats, and is sufficiently resilient to resume its former shape when the weight is removed.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

I claim:

1. A retrieval guide for a boat trailer comprising:
   a) mounting means for mounting the guide to a frame of the trailer, comprising plate means for supporting the guide and clamp means for attaching the plate means to a cross-member of the trailer;
   b) a guide arm having upper and lower ends and a length therebetween, having a generally flat rectangular bottom with two ends and two side edges, with two side panels extending upward from the side edges of the bottom, forming a U-shaped channel, with open ends;
   c) pivot means for pivotally mounting the lower end of the guide arm to the plate means of the mounting means, whereby the guide arm may pivot from a lowered position in which the guide arm is generally horizontal and parallel to the trailer frame to a raised position in which the guide arm extends above the trailer frame on an angle;
   d) two cylindrical rollers for guiding the bottom of a boat onto the trailer, one attached to each side panel of the guide arm at the upper end thereof by means of a roller arm means extending above said guide arm side panels a sufficient distance that the rollers may rotate freely about its axis on the roller arm means without contacting the guide arm;
   e) the axes of the two cylindrical rollers being inclined toward a center of the guide arm, such that the axes of the two cylindrical rollers meet at a point lower than the point of attachment of the rollers with their roller arm means, forming a shallow "V"; and
   f) spring means for biasing the guide arm toward its raised position, attached to the guide arm and to the plate means of the mounting means.

2. The retrieval guide of claim 1, in which: a) the plate means of the mounting means comprises a generally flat base portion for mounting to the trailer cross-members and side flanges protruding from the sides of the base portion, forming a U-shaped channel with an open top and bottom, a width of the base portion between the side flanges being slightly larger than a width of the guide arm U-channel to an outside of the side panels of the guide arm channel, such that the lower end of the guide arm channel may fit within the lower end of the mounting means channel;
   b) the pivot means comprises a pivot shaft passing through holes in the side panels of the channel forming the guide arm and holes in the side flanges of the channel forming the plate means of the mounting means.

3. The retrieval guide of claim 2 in which the clamp means of the mounting means comprises a plurality of "U-bolts" of a kind having two parallel threaded ends and a length therebetween bent into the shape of a "U", the threaded ends passing through holes in the base portion of the plate means of the mounting means, and nut means threaded onto the threaded ends inside the channel of the plate means, whereby the U bolts may be tightened down onto a cross-member of the trailer, holding the mounting means firmly in place.

4. The retrieval guide of claim 3 in which the base portion of the plate means of the mounting means is provided with a plurality of holes for mounting cross-members of varying vertical dimensions.

5. The retrieval guide of claim 4 in which the plurality of holes are arranged in groups, one group for each U-bolt, as follows:
   a) a primary hole; and
   b) a plurality of secondary holes arranged in an arc, the radius of the arc being equal to a distance between the threaded ends of the U-bolt; such that in order to mount the mounting means to a cross-member of given vertical dimension, the threaded ends of each U-bolt are passed through the primary hole and the secondary hole whose center is located a vertical distance below a center of the primary hole which is slightly greater than a vertical dimension of the cross-member which it is desired to fit.

6. The retrieval guide of claim 1 in which the spring means comprises a plurality of resilient elements having first and second ends, the first end being attached to an upper end of the plate means of the mounting means, and the second end being attached to the guide arm, such that the resilient elements are stretched as the guide arm is lowered from its raised position to its lowered position.

7. The retrieval guide of claim 6 in which there are a plurality of attachment points on the guide arm for the second ends of the resilient elements, whereby the tension of the resilient elements may be adjusted by moving the second ends of the resilient elements from one attachment point to another.

8. The retrieval guide of claim 6 in which the resilient elements are springs.

9. The retrieval guide of claim 6 in which the resilient elements are bungee cords.

10. The retrieval guide of claim 1 in which the cylindrical rollers are polyurethane.

11. The retrieval guide of claim 1 in which the guide arm is made of a material having a property of resiliently deforming slightly under load, such that the channel of the guide arm will flex slightly as the boat is supported by the rollers, conforming the "V" formed by the roller axes to the shape of the boat.

12. The retrieval guide of claim 11, in which the material of the guide arm is aluminum.

13. The retrieval guide of claim 1, in which an angle between the raised position and the lowered position of the guide arm is less than or equal to 45°.

* * * * *